(12) United States Patent
Koike et al.

(10) Patent No.: US 8,115,706 B2
(45) Date of Patent: Feb. 14, 2012

(54) IMPROVING DISPLAYED TEXTURE BY CHANGING BRIGHTNESS AT PARTICULAR POINTS

(75) Inventors: Takafumi Koike, Sagamihara (JP); Kei Utsugi, Kawasaki (JP); Michio Oikawa, Machida (JP); Masami Yamasaki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 974 days.

(21) Appl. No.: 12/051,869

(22) Filed: Mar. 20, 2008

(65) Prior Publication Data

US 2008/0316374 A1 Dec. 25, 2008

(30) Foreign Application Priority Data

Jun. 21, 2007 (JP) ................. 2007-163726

(51) Int. Cl.
- G09G 3/30 (2006.01)
- G09G 5/00 (2006.01)
- G09G 5/02 (2006.01)
- G09G 5/10 (2006.01)
- G03B 21/60 (2006.01)
- G02B 5/02 (2006.01)

(52) U.S. Cl. .......... 345/77; 345/582; 345/589; 345/690; 359/459; 359/599

(58) Field of Classification Search ............... 345/1.1–9, 345/77; 348/14.01–14.06, 87; 349/95
See application file for complete search history.

(56) References Cited

U.S. PATENT DOCUMENTS

| | | | |
|---|---|---|---|
| 5,109,430 A * | 4/1992 | Nishihara et al. | 382/151 |
| 2005/0195330 A1* | 9/2005 | Zacks et al. | 348/564 |
| 2006/0209066 A1* | 9/2006 | Kubara et al. | 345/424 |
| 2007/0018996 A1* | 1/2007 | Wang et al. | 345/592 |
| 2007/0091434 A1* | 4/2007 | Garner et al. | 359/459 |

FOREIGN PATENT DOCUMENTS

JP 2006-235415 9/2006

OTHER PUBLICATIONS

F. E. Nicodemus, et al., "Geometric considerations and nomenclature for reflectance", Monograph 161, National Bureau of Standards (US), Oct. 1977.
Kristin J. Dana, et al., "Reflectance and Texture of Real-World Surfaces", ACM Transactions on Graphics, vol. 18, No. 1, pp. 1-34, 1999.
M. G. Lippmann, "Epreuves reversibles donnant la sensation du relief", J. de Phys, vol. 7, pp. 821-825, 1908.

* cited by examiner

*Primary Examiner* — Bipin Shalwala
*Assistant Examiner* — Ryan A Lubit
(74) *Attorney, Agent, or Firm* — Antonelli, Terry, Stout & Kraus, LLP.

(57) ABSTRACT

The present invention represents an object with high-quality texture. A texture image display apparatus includes: a panel display device (20) having a plurality of pixels (21); a lens array (30) having a plurality of lenses for controlling outgoing directions of light outputted from the pixels (21); a pixel data generation part (14) for generating pixel data for each pixel; and a panel driving circuit 15 for driving the panel display device (20) on the basis of the pixel data. One lens (31) is provided for a plurality of adjacent pixels (21), and directs light outputted from these adjacent pixels (21) in directions different from one another. For each pixel (21), the pixel data generation part (14) generates pixel data of different image brightness levels depending on outgoing direction of light, for the same image point in displayed content.

6 Claims, 12 Drawing Sheets

Profile data

| Lens coordinates (s, t) | Pixel coordinates (x, y) | Outgoing direciton (u, v) |
|---|---|---|
| (0,0) | (0,0) | (2,2) |
| (0,0) | (1,0) | (1,2) |
| (0,0) | (2,0) | (0,2) |
| (0,0) | (0,1) | (2,1) |
| (0,0) | (1,1) | (1,1) |
| (0,0) | (2,1) | (0,1) |
| (0,0) | (0,2) | (2,0) |
| (0,0) | (1,2) | (1,0) |
| (0,0) | (2,2) | (0,0) |
| (0,1) | (0,3) | (2,2) |
| ⋮ | ⋮ | ⋮ |

IMPROVING DISPLAYED TEXTURE BY CHANGING BRIGHTNESS AT PARTICULAR POINTS

BACKGROUND OF THE INVENTION

The present invention relates to a texture image display apparatus that displays texture of an object.

For example, an image display apparatus may be a liquid crystal display, a plasma display unit, or the like. Conventionally, these display apparatuses improve texture display of an object by improving performance relating to the three basic elements, i.e., color, brightness, and resolution.

The below-mentioned Non-patent Document 1 and Non-patent Document 2 disclose techniques of representing texture of an object. In detail, Non-patent Document 1 discloses a Bidirectional Reflectance Distribution Function (BRDF), and Non-patent Document 2 discloses a Bidirectional Texture Function (BTF). Both functions are functions whose arguments are an incidence angle and a reflection angle (outgoing angle) of light. This indicates that improvement of only performance relating to color and brightness is not sufficient for representing texture, and directions of light rays should be considered also.

As a display apparatus that considers directions of light rays, a compound eye stereoscopic display apparatus may be cited. The below-mentioned Non-patent Document 3 discloses the principle of integral photography for realizing stereoscopic viewing by controlling directions of light rays.

Non-patent Document 1: F. E. Nicodemus, et al., Geometric considerations and nomenclature for reflectance, Monograph 161, National Bureau of Standards (US), October 1977.

Non-patent Document 2: Kristin J. Dana, et al., Reflectance and Texture of Real-World Surfaces, ACM Transactions on Graphics, Vol. 18, No. 1, pp. 1-34, 1999.

Non-patent Document 3: M. G. Lippmann, Epreuves reversibles donnant la sensation du relief, J. de Phys, Vol. 7, pp. 821-825, 1908.

As described above, there is a problem in that the conventional image display apparatuses only improve performance relating to color and brightness, and cannot sufficiently represent texture of an object.

The present invention has been made considering the above problem. An object of the present invention is to provide a texture image display apparatus that can represent an object with improved quality of texture.

SUMMARY OF THE INVENTION

To solve the above problem, the present invention provides a texture image display apparatus comprising: a display device having a plurality of pixels; a light ray control element array that has a plurality of light ray control elements for directing incident light toward a plurality of predetermined outgoing directions depending on a light incidence parameter, in order to control outgoing directions of light emitted by the display device; a pixel data generation unit, which generates pixel data for each pixel of the display device depending on an outgoing direction of light outputted from the pixel in question, such that brightness of an image at a point in displayed content is changed depending on the plurality of predetermined outgoing directions; and a driving unit, which generates a driving signal based on the pixel data generated by the pixel data generation unit for each pixel of the display device and delivers the generated driving signal to the display device to drive the display device.

Preferably the texture image display apparatus further comprises: a data acquisition unit, which acquires, for each point on an object to be displayed, a reflectance function that has as parameters a direction of incident light and a direction of outgoing light with respect to the object, and indicates reflectance, which is a ratio of a light quantity of the outgoing light to light quantity of the incident light, and acquires texture data of the object and incident light data indicating brightness of the incident light; and the pixel data generation unit uses, as the pixel data for each pixel that outputs light directed in a predetermined outgoing direction through a light ray control element, to represent a certain point on the object, a value obtained by multiplying together a reflectance indicated by the reflectance function having the predetermined outgoing direction relating to the point as a parameter, the texture data relating to the point, and the incident light data relating to the point.

According to the present invention, brightness of an image at the same point in content to be displayed varies depending on a plurality of outgoing directions, and the object is seen differently depending on viewing directions of a viewer. As a result, the present invention can represent an object with high-quality texture.

BRIEF DESCRIPTION OF THE DRAWINGS

FIGS. 6A, 6B are illustrations showing effects of the first embodiment of the present invention, wherein

FIGS. 7A, 7B are explanatory views showing how a display is seen for different lens pitches of a lens array in the first embodiment of the present invention.

FIGS. 11A, 11B are explanatory views showing respective travel directions of light from pixels in the fourth embodiment of the present invention.

DETAILED DESCRIPTION

In the following, embodiments of texture image display apparatus according to the present invention will be described referring to the drawings.

First, referring to FIGS. 1-6, a texture image display apparatus as a first embodiment of the present invention will be described.

Figure 1:
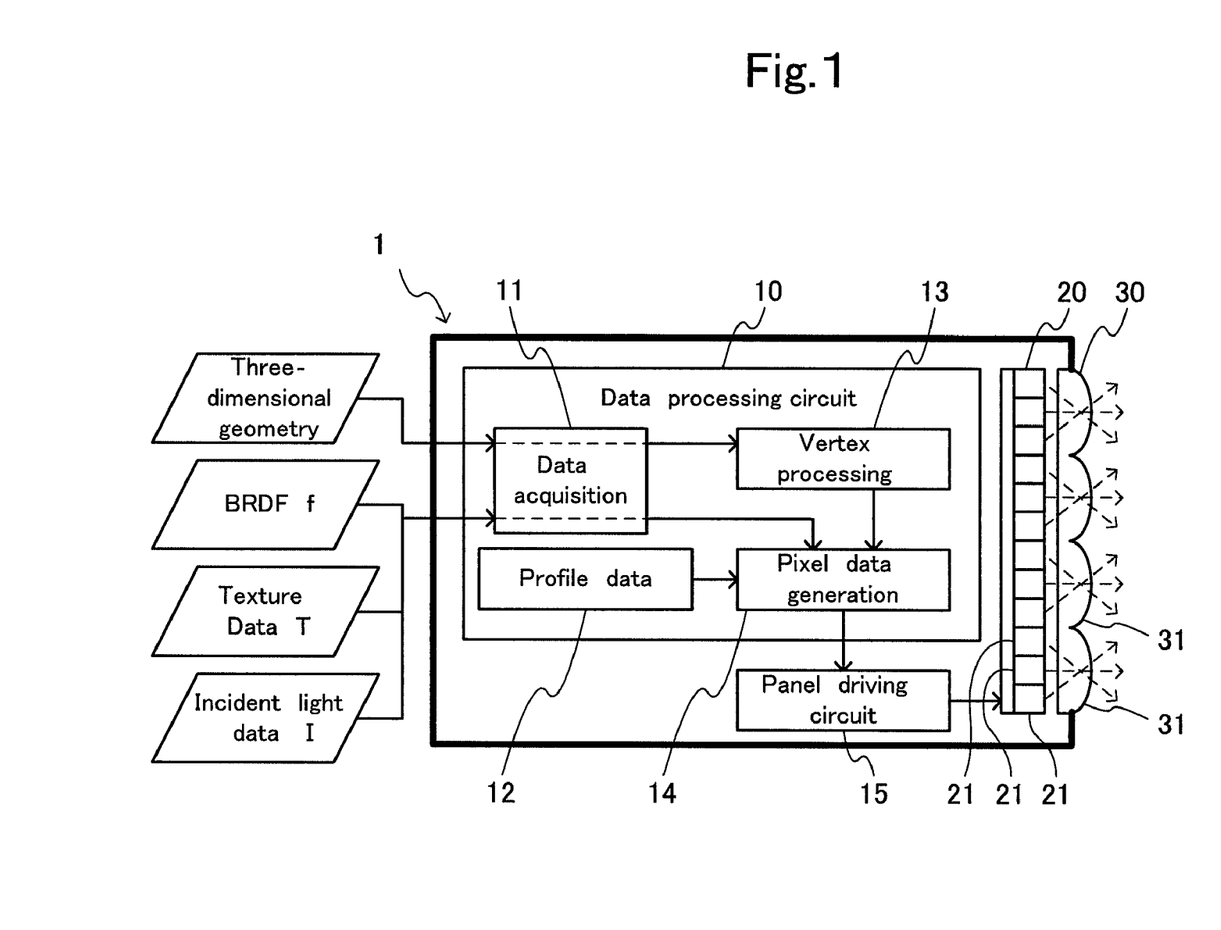
FIG. 1 is a block diagram showing a texture image display apparatus of a first embodiment according to the present invention.

As shown in FIG. 1, the texture image display apparatus 1 comprises: a panel display device 20 having a plurality of pixels 21, 21, . . . ; a lens array 30 having a plurality of lenses 31, 31, . . . for changing directions of light outputted from the pixels 21, 21, . . . of the panel display device 20; a data processing circuit 10; and a panel driving circuit 15 for driving the panel display device 20 on the basis of data processed by the data processing circuit 10.

Specifically, the panel display device 20 is a liquid crystal panel display device, a plasma panel display device, an EL panel display device, or the like, for example.

Figure 2:
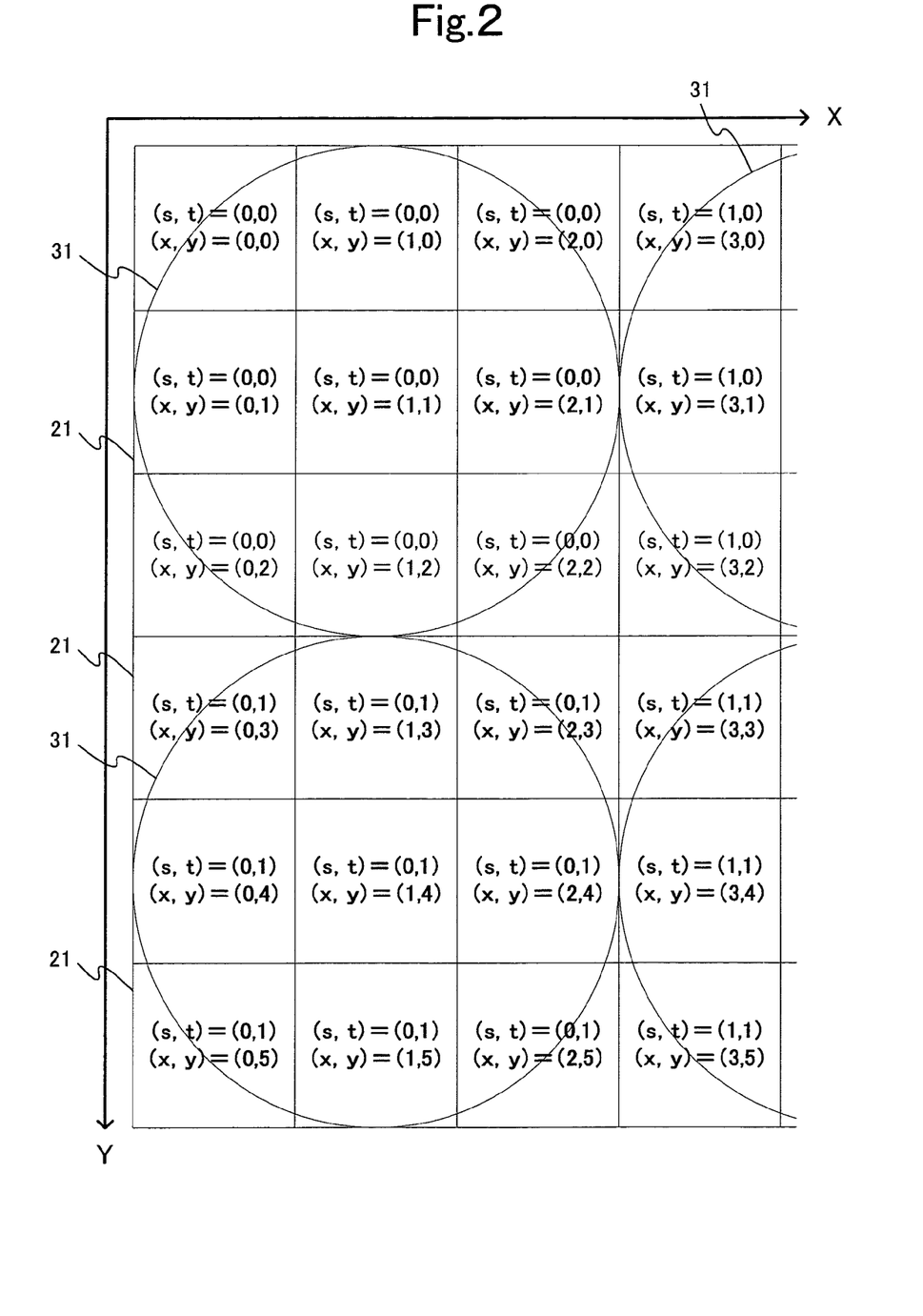
FIG. 2 is an explanatory view showing positional relationship between pixels and lenses of a lens array in a panel display device in the first embodiment of the present invention.
Figure 3:
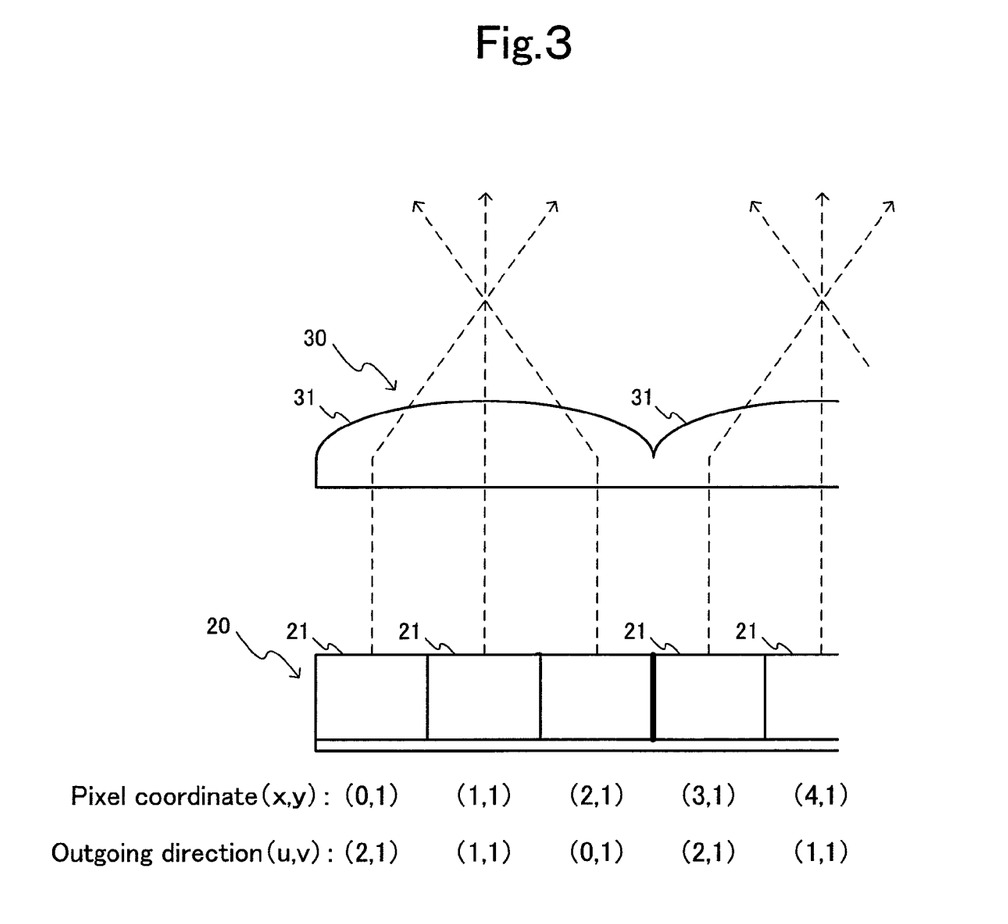
FIG. 3 is an explanatory view showing travel directions of light from pixels of the panel display device in the first embodiment of the present invention.

As shown in FIGS. 2 and 3, the size and position of each lens 31 of the lens array 30 are determined such that the lens 31 can receive light from a plurality of pixels 21, 21, . . . , and can output light from these pixels in respective directions. In the example shown in FIGS. 2 and 3, each lens 31 can have incident light rays from a total of nine pixels 21 arranged in three rows and three columns each including three pixels 21 in the panel display device 20.

Now, a pixel coordinate system and a lens coordinate system will be described.

The pixel coordinate system is a coordinate system for specifying a position of each pixel 21. An x direction of the pixel coordinate system is defined as a lateral direction of the panel display device 20 and a y direction as a longitudinal direction, and the width of one pixel is defined as a unit length "1". Thus, for example, a pixel 21 at coordinates (1, 0) is adjacent to a pixel 21 at coordinates (0, 0) in the +x direction. A pixel 21 at coordinates (0, 1) is adjacent to a pixel 21 at coordinates (0, 0) in the +y direction.

The lens coordinate system is a coordinate system for specifying a position of each lens 31. An s direction of the lens coordinate system is defined as the lateral direction of the panel display device 20, and a t direction as the longitudinal direction, and the effective diameter of one lens is defined as a unit length "1". Thus, for example, a lens 31 at coordinates (1, 0) is adjacent to a lens 31 at coordinates (0, 0) in the +s direction. A lens 31 at coordinates (0, 1) is adjacent to a lens 31 at coordinates (0, 0) in the +t direction.

Relation between lens coordinates (s, t) and pixel coordinates (x, y) can be expressed by the following relations.

$s = x/3$ (decimal places are discarded)

$t = y/3$ (decimal places are discarded)

Thus, pixels 21 at pixel coordinates (0, 0), (1, 0), (2, 0), (1, 0), (1, 1), (1, 2), (2, 0), (2, 1), and (2, 2), whose light rays are incident on the lens 31 at the lens coordinates (0, 0), are all represented by the lens coordinates (0, 0).

Referring to FIG. 1 again, the data processing circuit 10 will be described.

The data processing circuit 10 comprises: a data acquisition part 11 for acquiring data of an image to be reproduced on the texture image display apparatus 1; a vertex processing part 13 for converting three dimensional geometry data acquired by the data acquisition part 11 into two-dimensional data; a profile data storage part 12 that stores information such as a relation between a pixel 21 of the panel display device 20 and a lens 31 of the lens array 30; and a pixel data generation part 14 that generates pixel data for each pixel 21 of the panel display device 20.

The data acquisition part 11 comprises, for example: a receiving unit for receiving data of an image to be reproduced on the texture image display apparatus 1 through a communication network, a playing unit for playing a storage medium that stores data of an image to be produced on the texture image display apparatus 1, and the like.

Figure 4:
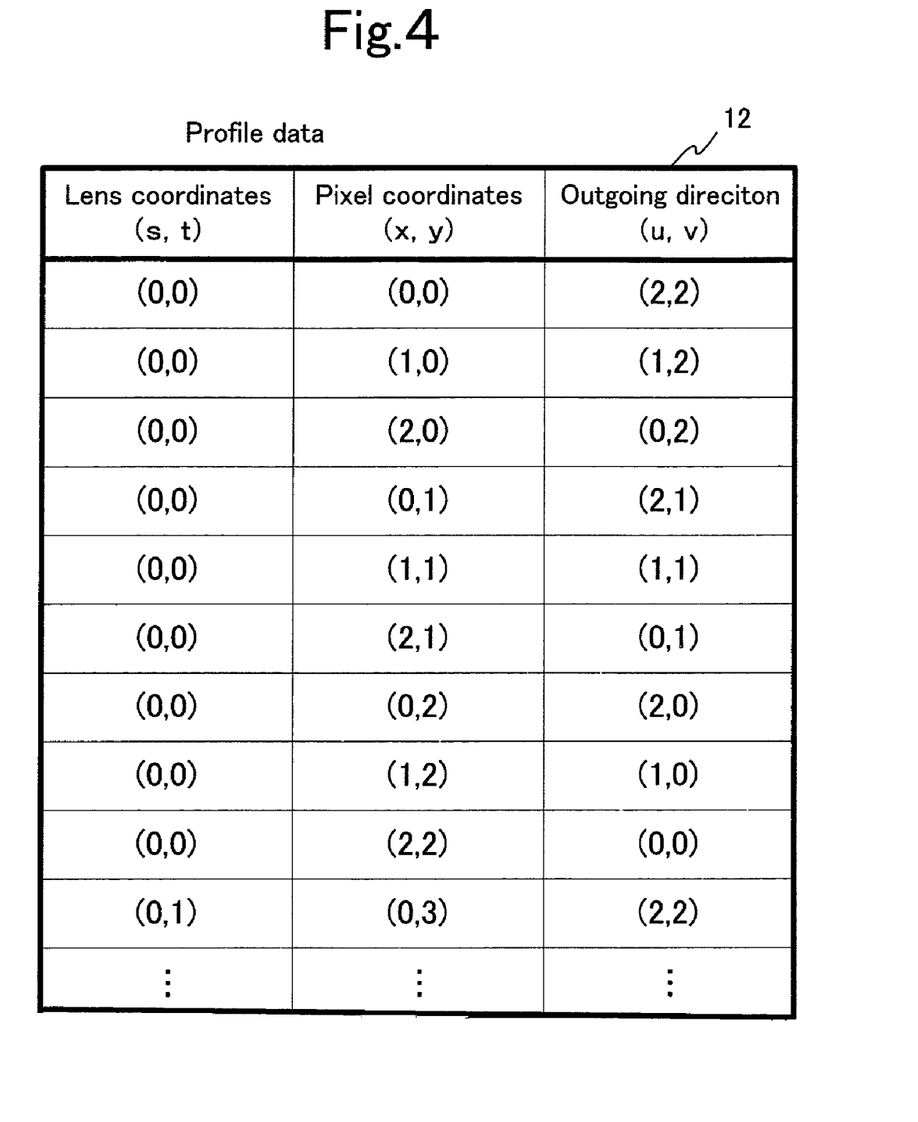
FIG. 4 is an explanatory view showing data structure of profile data in the first embodiment of the present invention.

As shown in FIG. 4, the profile data storage part 12 stores: pixel coordinates (x, y) of the pixels 21, 21, . . . of the panel display device 20; coordinates expressed in the lens coordinate system of the pixel coordinates (x, y) of the pixels 21, 21, . . . , or, in other words, lens coordinates (s, t) of the lenses on which light from the pixels 21, 21, . . . is incident; and vectors of directions of light rays outputted from the pixels 21, 21, . . . after passing through the respective corresponding lenses 31, i.e., outgoing direction vectors (u, v).

Next, operation of the texture image display apparatus 1 of the present embodiment will be described.

First, the data acquisition part 11 of the texture image display apparatus 1 acquires data to be reproduced. As shown in FIG. 1, such data include three dimensional geometry data, a Bidirectional Reflectance Distribution Function (BRDF), texture data, and incident light data.

Three dimensional geometry data are data indicating an outer shape of an object. Here, a surface shape of an object is treated as a set of triangles. Thus, three dimensional geometry data are a set of three-dimensional coordinates of vertices of triangles indicating a surface shape of an object.

Receiving three dimensional geometry data from the data acquisition part 11, the vertex processing part 13 converts the three-dimensional coordinates of the vertices into two-dimensional lens coordinates (s, t). Thus, one vertex is represented by one lens 31. This means that nine pixels 21, 21, . . . corresponding to one lens 31 output respective light rays indicating the same one vertex.

The pixel data generation part 14 performs rasterization processing based on a converted coordinate of each vertex of the triangles. Rasterization is one kind of basic processing in computer graphics technology. Rasterization is a technique of filling the inside of a triangle with some color and brightness. To fill the inside of each triangle with some color at some brightness level, the pixel data generation part 14 determines a color and brightness outputted by each pixel 21, and delivers the determined data as a drive control signal to the panel driving circuit 15.

Assuming that the panel display device 20 is a black-and-white display device, for the sake of simplicity, a method of determining brightness of a light ray outputted by each pixel of the panel display device 20 will be described.

As described above, the data acquisition part 11 acquires BRDF, the texture data and the incident light data in addition to the three dimensional geometry data.

As shown in the following, a BRDF f is a function that shows reflectance of outgoing light to incident light on the basis of parameters, i.e., coordinates (s, t), a direction vector (u', v') of incident light on an object, and a direction vector (u, v) of outgoing light from the object. Reflectance indicated by a BRDF is a value expressed as a floating decimal in the range 0-1.

BRDF: f(s, t, u, v, u', v')

The nature of the texture data T is a coefficient of brightness. As shown in the following, the texture data T is expressed as a dimensionless value dependent on coordinates (s, t) as a parameter. The texture data T is a value expressed as a floating decimal in the range 0-1.

Texture data: T(s, t)

The incident light data I indicates brightness, and has, as parameters, coordinates (s, t) and a direction vector (u', v') of incident light on an object as shown in the following.

Incident light data: I(s, t, u', v')

Here, in step where the BRDF, the texture data and the incident light data are acquired by the data acquisition part 11, the coordinates included in the parameters of these data and the function are expressed in the three-dimensional coordinate system. The pixel data generation part 14 converts the coordinates represented in the three-dimensional coordinate system into coordinates (s, t) represented in the two-dimensional lens coordinate system. Thus, the above-mentioned BRDF, texture data and incident light data are those after the coordinate conversion.

Using the above-mentioned BRDF f, texture data T and incident light data I as well as the profile data stored in the profile data storage part 12, the pixel data generation part 14 obtains the pixel value of a pixel 21 at each pixel coordinate (x, y), i.e., brightness of light represented by the pixel 21 in question.

Next, a procedure for the pixel data generation part 14 to obtain brightness of each pixel 21 will be described following the flowchart shown in FIG. 5.

First, the pixel data generation part 14 sets each of y and x of the pixel coordinates (x, y) to "0" as initial setting (S1, S2).

Next, the pixel data generation part 14 obtains lens coordinates (s, t) corresponding to the pixel coordinates (x, y) set in steps S1 and S2. At the same time, the pixel data generation part 14 obtains an outgoing direction vector (u, v) of light corresponding to the pixel coordinates (x, y) by referring to the profile data stored in the profile data storage part 12 (S3).

Next, from the above-acquired BRDF f, texture data T and incident light data I, the pixel data generation part 14 extracts BRDF f, texture data T and incident light data I that include the parameters obtained in step S3 (S4). In detail, the pixel data generation part 14 extracts BRDF f that includes, as parameters, the lens coordinates (s, t) and the light outgoing direction vector (u, v) corresponding to the pixel coordinates (x, y), which were obtained in step S3, from the above-acquired BRDF f. Further, the pixel data generation part 14 extracts texture data T that includes, as parameters, the lens coordinates (s, t) obtained in step S3, from the above-acquired texture data T. The pixel data generation part 14 extracts incident light data I that includes, as parameters, the lens coordinates (s, t), from the above-acquired incident light data I.

Then, as shown in the following, the pixel data generation part 14 multiplies the BRDF f, texture data T and incident light data I obtained in step 4, to obtain brightness $O_{(x, y)}$ of the pixel 21 indicated by the pixel coordinates (x, y) (S5).

$O_{(x, y)}$=f(s, t, u, v, u', v')*T(s, t)*I(s, t, u', v')

When the brightness $O_{(x, y)}$ of the pixel 21 indicated by the above-determined pixel coordinates (x, y) is obtained, then the pixel data generation part 14 adds 1 to the value of x (S6), and judges whether the resultant x coordinate value exceeds the maximum value of the panel display device 20 (S7). When the x coordinate value does not exceed the maximum value of the panel display device 20, then the processing returns to step S3 to perform the processing from step S3 through step S7 with respect to this new pixel coordinates (x, y). On the other hand, when the x coordinate value exceeds the maximum value of the panel display device 20, then the pixel data generation part 14 adds 1 to the value of y (S8), and judges whether the resultant y coordinate value exceeds the maximum value of the panel display device 20 (S9). When the y coordinate value does not exceed the maximum value of the panel display, then the processing returns to step S2. On the other hand, when the y coordinate value exceeds the maximum value of the panel display device 20, it is judged that brightness of all the pixels 21 has been obtained, and the processing is ended.

The above description assumes for the sake of simplicity that the panel display device 20 is a black-and-white display device. In the case where the panel display device 20 is a color display device, a parameter λ indicating a color is added to the parameters of the BRDF f and the incident light data I as shown in the following expressions. The color and brightness $O_{(x, y)\lambda}$ of a pixel 21 indicated by a pixel coordinate (x, y) is obtained by multiplying these BRDF f, incident light data I and texture data T.

BRDF: f(x, t, u, v, u', v', λ)

Incident light data: I(s, t, u', v', λ)

where l is a vector value indicating a ratio of RGB components of the three primary colors.

Data of the thus-obtained brightness of each pixel 21 of the panel display device 20 are sent as the drive control signal to the panel driving circuit 15 so that each pixel 21 of the panel display device 20 outputs light of the determined brightness. Each lens 31 of the lens array 30 receives incident light rays from nine pixels 21, 21. Although these nine pixels 21, 21, ... output light rays for displaying the same point of the displayed object, the brightness of each light ray is different. Further, outgoing direction of each light ray from the lens 31 is different. As a result, even when a viewer of this texture image display apparatus views the same point in a displayed image, brightness of the point is seen differently if the viewer is at a different view position.

Now, referring to FIGS. 6A, 6B, effects of the texture image display apparatus 1 of the present embodiment will be described.

Figure 6A:
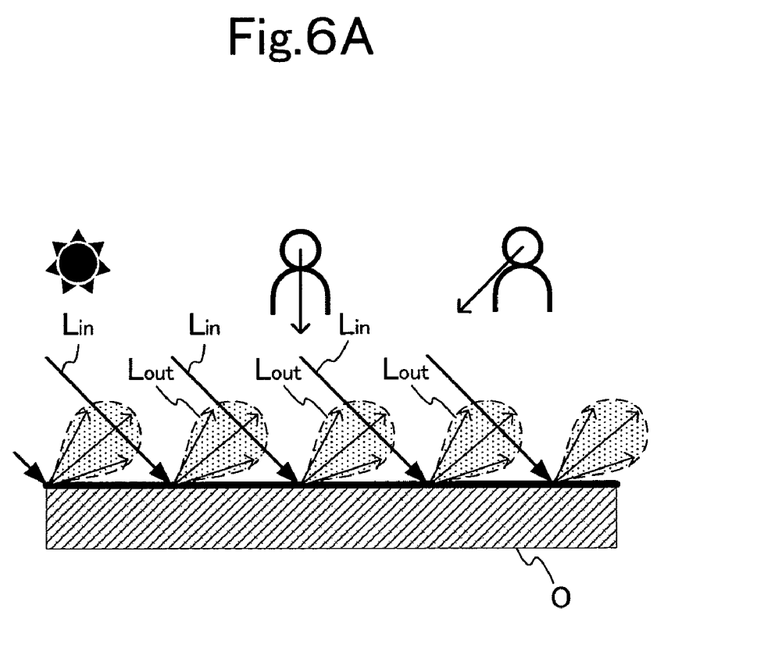
FIG. 6A is an illustration showing a state of reflection of light from an object when light shines on the object.
Figure 6B:
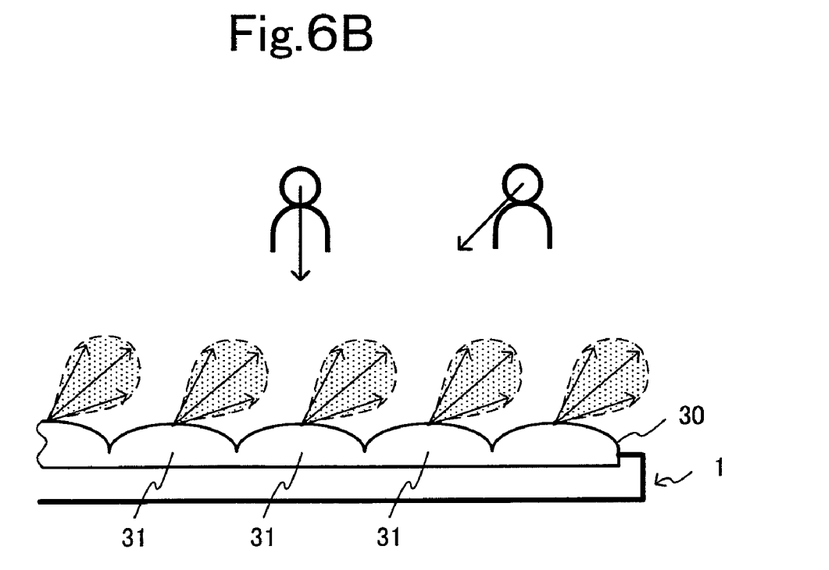
FIG. 6B is an illustration showing a state of outgoing of light from the texture image display apparatus when the object is displayed.

As shown in FIG. 6A, it is assumed that light $L_{in}$ from a light source is incident on an object O, and light $L_{out}$ is emitted in outgoing directions having a distribution as shown in the figure. A viewer of the object O sees light $L_{out}$ from the object. Thus, when the viewer is at a different position, the same point of the object O is seen differently.

When the texture image display apparatus 1 of the present embodiment represents a point on the object O, the texture image display apparatus 1 outputs light rays in a plurality of directions to represent the point in question, and controls brightness of the light in each direction such that the outgoing direction distribution of the light $L_{out}$ from the real object O can be reproduced. As a result, a viewer of the texture image display apparatus 1 can view a display image of an object O as if he were viewing the real object O. Thus, the present invention can represent high-quality texture of an object.

In the present embodiment, the lens array 30 having a plurality of lenses 31, 31, ... are used as a light ray control element array. Instead of the lens array 30, it is possible to use a pinhole array in which a plurality of pinholes are formed, a mirror array having a plurality of driven mirrors as shown in the below-described embodiment, or a liquid crystal panel, for example. Further, the lens array 30 of the present embodiment is arranged such that a plurality of lenses 31, 31, . . . are positioned at intersections of square cells. However, arrangement of a plurality of light ray control elements is not limited to this. For example, another arrangement such as a delta arrangement may be employed.

Further, in the present embodiment, a plurality of lenses 31, 31, . . . of the same diameter are arranged at regular intervals La. However, it is possible that the diameter of a lens on the periphery of the lens array is smaller than the diameter of a lens in the center, and, at the same time, the interval between lenses on the periphery of the lens array is smaller than the interval in the center.

Figure 7A:
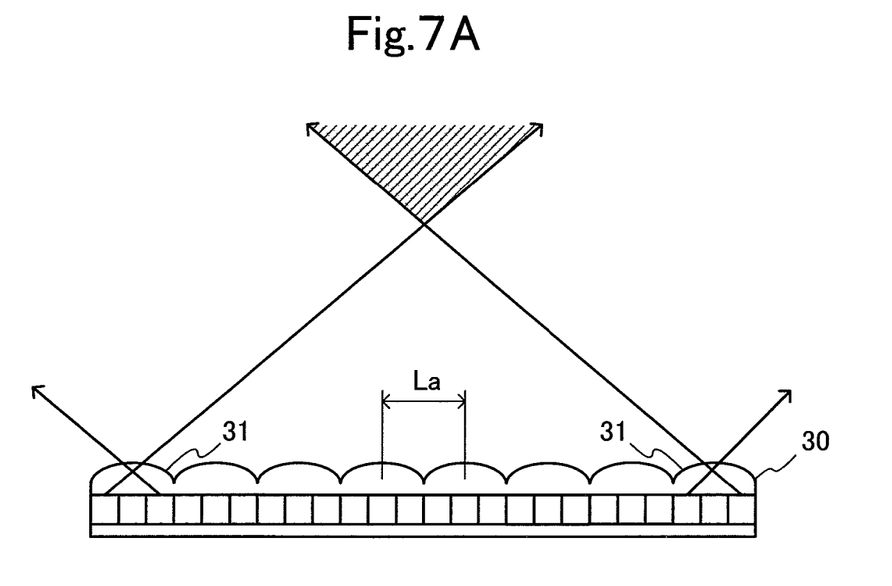
FIG. 7A shows a texture recognition area when lens pitch is the same.
Figure 7B:
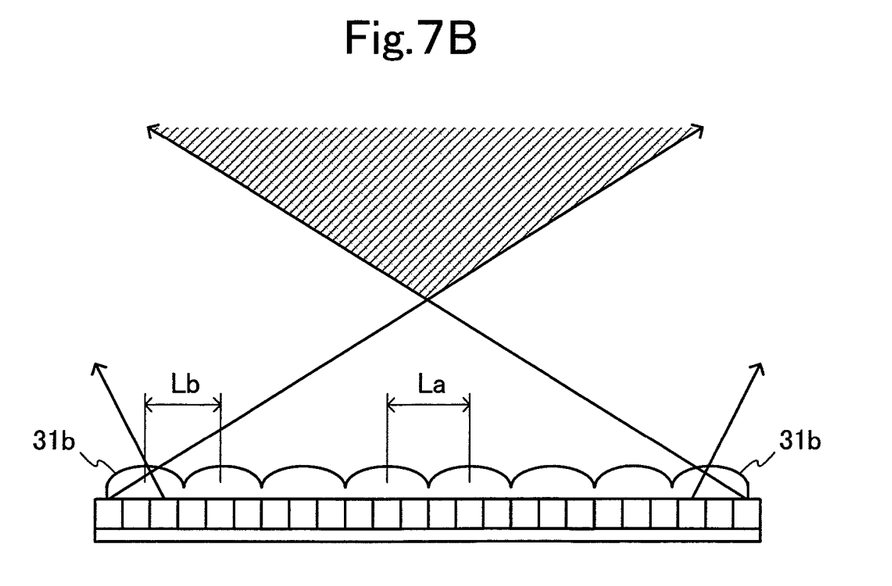
FIG. 7B shows a texture recognition area when lens pitch at the periphery is small.

In the case where a plurality of lenses 31, 31, . . . of the same diameter are arranged at regular intervals La as in the present embodiment shown in FIG. 7A, viewer's locations where it is possible to recognize texture with respect to an image formed by light from one end of the lens array 30 and an image formed by light from the other end, are shown as a hatched area in the figure. This area is one located between a light ray that is controlled in its outgoing direction and outputted from a lens 31 on one end of the lens array 30 and a light ray that is controlled in its outgoing direction and outputted from a lens 31 on the other end. On the other hand, as shown in FIG. 7B, when a diameter of a lens on the periphery of the lens array is smaller than the diameter of a lens in the center and an interval Lb between lenses on the periphery is smaller than the interval La between lenses in the center, then the light ray that is controlled in its outgoing direction and outputted from the lens 31b on one end of the lens array and the light ray that is controlled in its outgoing direction and outputted from the lens 31b on the other end are both inclined to make the area located between these light rays, i.e., the hatched area becomes larger. As a result, the feasible area for viewers who can recognize texture can be enlarged. As a method of enlarging the feasible area of viewers who can recognize texture, it is possible to consider, for example, a method in which optical design of lenses is changed between the central part and the peripheral part of the lens array and a method in which lenses in the peripheral part are inclined in comparison with lenses in the central part, in addition to the above-described method.

Figure 8:
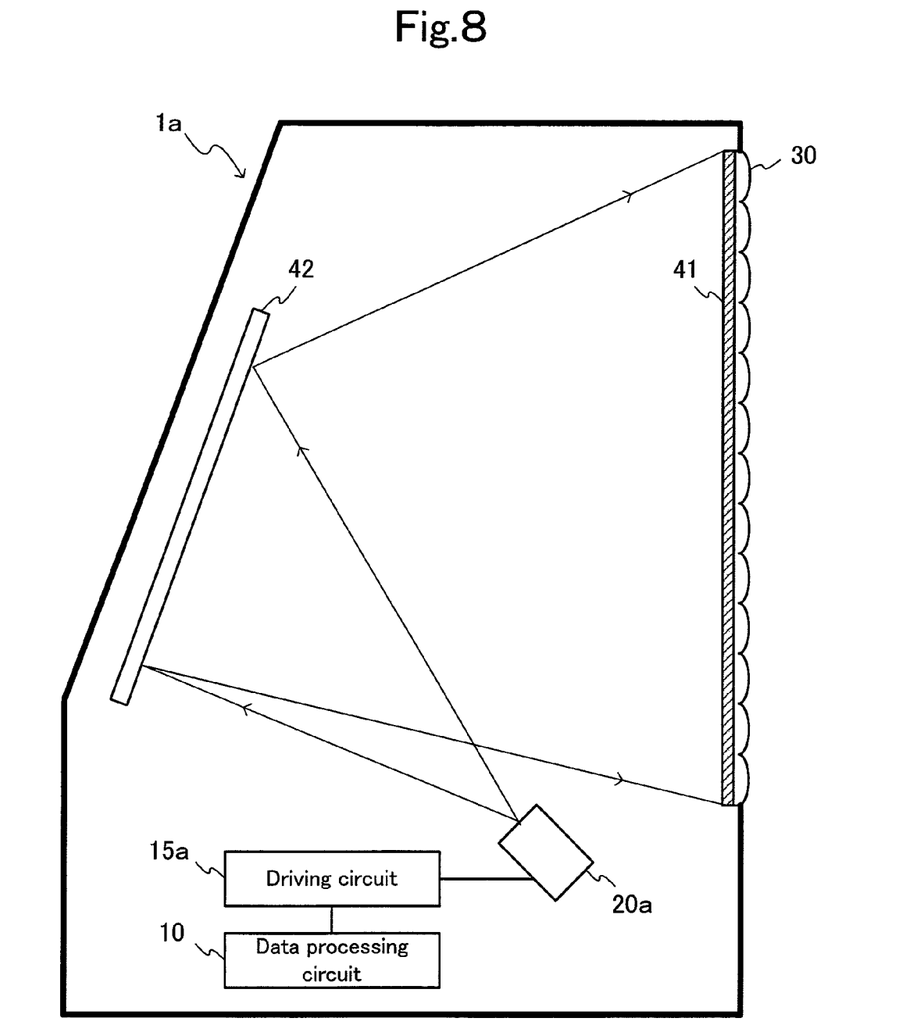
FIG. 8 is a diagram showing a configuration of a texture image display apparatus of a second embodiment according to the present invention.

Next, a texture image display apparatus of a second embodiment according to the present invention will be described, referring to FIG. 8.

The texture image display apparatus 1a of the present embodiment is obtained by applying the present invention to a display apparatus generally called a rear-projector, and comprises: a screen 41; a lens array 30 attached to the surface of the screen 41; a projector 20a placed on the back surface side of the screen 41; a fixed mirror 42 that leads light from the projector 20a to the back surface of the screen 41; a driving circuit 15a for driving the projector 20a; and a data processing circuit 10 for sending a drive control signal to the driving circuit 15a.

The data processing circuit 10 is basically the same as the data processing circuit 10 of the texture image display apparatus 1 of the first embodiment. Further, the lens array 30 is arranged on the surface of the screen 41. As a result, similarly to the first embodiment, also the present embodiment can represent high-quality texture of an object.

Figure 9:
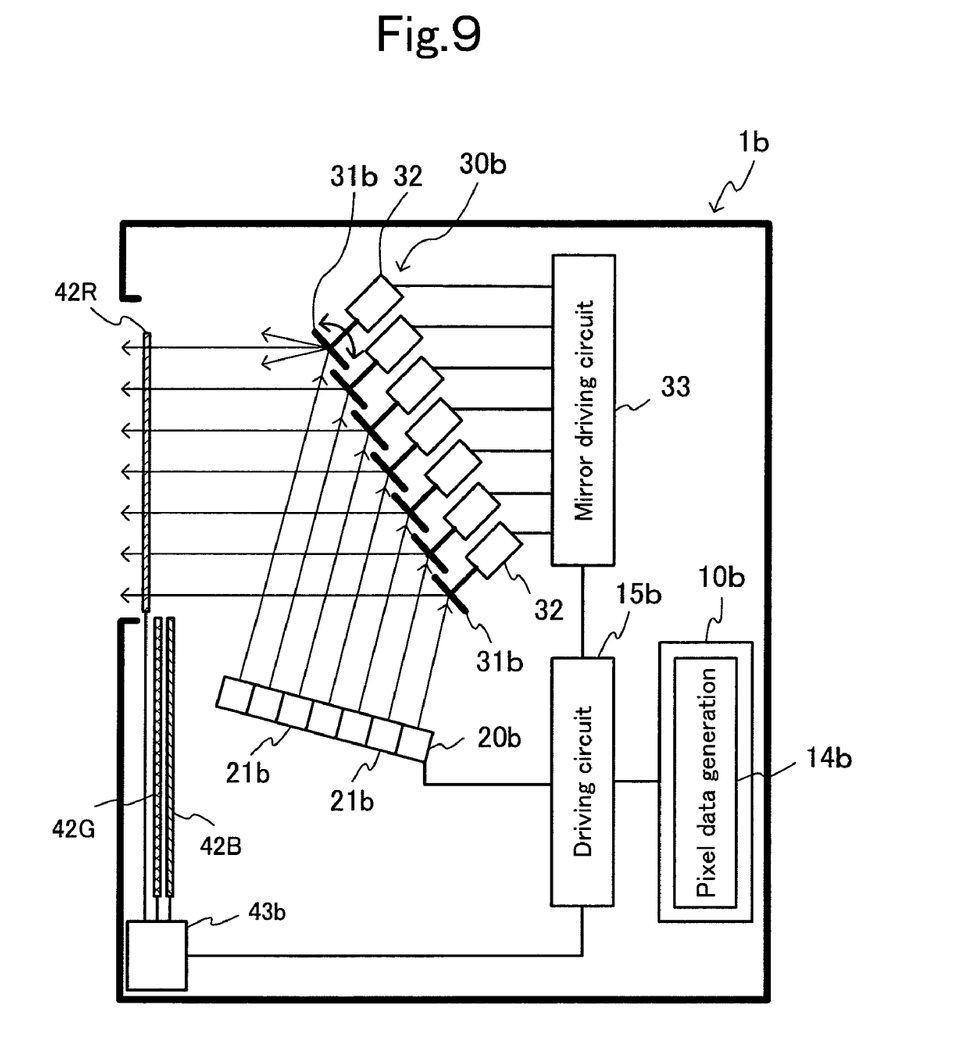
FIG. 9 is a diagram showing a configuration of a texture image display apparatus of a third embodiment according to the present invention.

Next, a texture image display apparatus of a third embodiment according to the present invention will be described referring to FIG. 9.

The texture image display apparatus 1b of the present embodiment uses a micro mirror array 30b that has a plurality of light ray control elements each comprising a mirror 31b and an actuator 32 for changing the direction of the mirror 31b.

The texture image display apparatus 1b comprises: this micro mirror array 30b; a mirror driving circuit 33 for driving and controlling each actuator 32 of the micro mirror array 30b; a light source array device 20b having a plurality of light sources such as LEDs; a light source driving circuit 15b for driving the light source array device 20b; and a data processing circuit 10b for sending a drive control signal to the light source driving circuit 15b.

Each actuator 32 of the micro mirror array 30b rotates a mirror 31b around two axes, i.e. an axis extending in a longitudinal direction and an axis extending in a lateral direction, to change the direction of the mirror 31b. Similarly to the first embodiment where one lens 31 directs light representing an image at the same point of an object toward nine direction, in the present embodiment, a direction of one mirror 31b is changed to predetermined nine directions different from one another so that one mirror 31b directs light representing an image at the same point of an object toward nine directions different from one another.

The number of mirrors 31b of the micro mirror array 30b is same as the number of the light sources 21b. In other words, one mirror 31b of the micro mirror array 30b corresponds to one light source 21b of the light source array device 20b. This is different from the first embodiment in which one lens 31 corresponds to nine pixels 21. Thus, in the present embodiment, light from one light source 21b is directed in nine directions, and accordingly one light source 21 emits light indicating one point of an image of an object, and the brightness of the light is changed sequentially to correspond to each outgoing direction determined by the mirror 31b.

Accordingly, a pixel data generation part 14b of the data processing circuit 10b of the present embodiment determines brightness of light representing a point of an image of an object, for each of the nine outgoing directions. Thus, pixel data of one light source 21b of the light source array device 20b are defined as brightness data for the nine outgoing directions.

When the light source driving circuit 15b receives pixel data from the pixel data generation part 14b of the data processing circuit 10b, the light source driving circuit 15b makes each light source 21b of the light source array device 20b output light rays of respective levels of brightness in the nine directions sequentially. The mirror driving circuit 33 receives a synchronizing signal from the light source driving circuit 15b to change the direction of each mirror 31b sequentially by its actuator 32, so that the light rays outputted from the corresponding light source 21b in the brightness levels corresponding to the predetermined nine outgoing directions are directed in those nine directions sequentially.

As a result, similarly to the first embodiment, in the present embodiment also, the brightness of the same point on an object is seen differently when the viewer is at a different viewing position. Thus, it is possible to show an object with high-quality texture.

To colorize the present embodiment, it is sufficient to attach red (R) filters to some of the light sources 21b of the light source array device 20b, green (G) filters to some light sources 21b, and blue (B) filters to the remaining light sources 21b. Or, as shown in FIG. 9, it is possible that an R filter 42R, a G filter 42G and a B filter 42b are arranged on the viewer's side from the micro mirror array 30b, and these filters 42R, 42G and 42B are positioned in turn in the light path of light rays from the mirrors 31b, being synchronized with the movement of the mirrors 31b according to instructions from the light source driving circuit 15b.

Next, a texture image display apparatus of a fourth embodiment according to the present invention will be described referring to FIGS. 10 and 11A, 11B.

Figure 10:
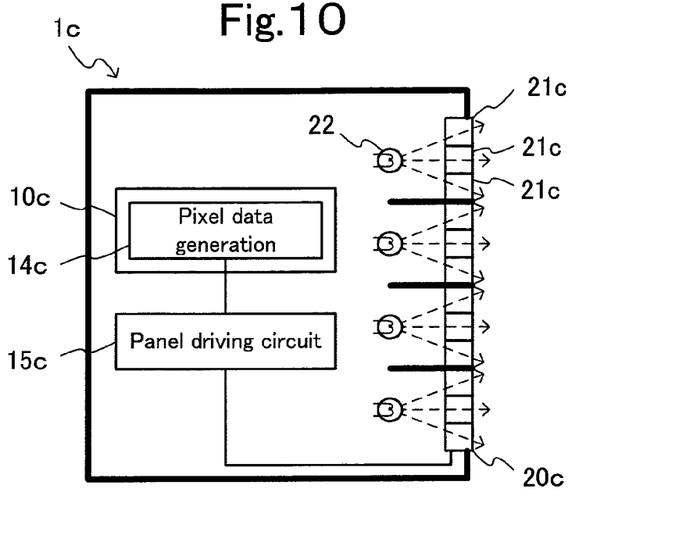
FIG. 10 is a diagram showing a configuration of a texture image display apparatus of a fourth embodiment according to the present invention.

As shown in FIG. 10, a display device of the texture image display apparatus 1c of the present embodiment comprises: a liquid crystal panel 20c having a plurality of pixels 21c, 21c, . . . ; and a plurality of light sources 22 that function as a back light of the liquid crystal panel 20c.

The texture image display apparatus 1c comprises: the display device, a panel driving circuit 15c for driving the liquid crystal panel 20c of the display device; and a data processing circuit 10c for sending a drive control signal to the panel driving circuit 15c.

Figure 11A:
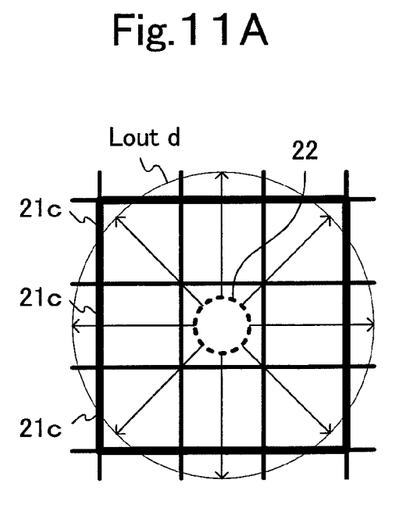
FIG. 11A shows travel direction of light when pixels are viewed from the front.
Figure 11B:
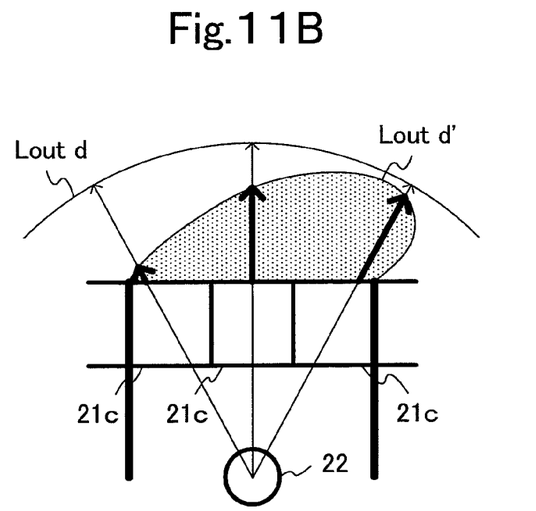
FIG. 11B shows travel direction of light when pixels are viewed from a side.

As shown in FIG. 11A, similarly to the panel display device 20 of the first embodiment, the liquid crystal panel 20c assigns nine pixels 21c, 21c, . . . to display one point on an object. One light source 22 is provided for every such nine pixels 21c. Thus, depending on relative relationships of the nine pixels 21c, 21c, . . . to a light source 22, light rays outputted from the light source 22 permeate the pixels 21c, 21c, . . . and are emitted in different directions from respective pixels 21c.

This light source 22 emits the same quantity of light in each direction at least on the side of the liquid crystal panel 20c. Thus, in the case where the pixels 21c, 21c, . . . have the same light transmittance, all the quantities of light outputted from the pixels in respective directions are the same. In other words, as shown in FIG. 11B, light emission distribution $L_{out\_d}$ of each light source 22 is uniform. On the other hand, in the case where light transmittances of the nine pixels 21c, 21c, . . . are different from one another for each light source, the respective quantities of light outgoing from the pixels 21c, 21c, . . . are also different from one another, and thus light emission distribution $L_{out\_d'}$ of each light source 22 becomes non-uniform. This means that light from each light source 22 is changed in its outgoing direction by the nine pixels concerned and the nine pixels 21c, 21c, . . . function as one light ray control element.

That is, in the present embodiment, the liquid crystal panel 20 is a part of the display device and, at the same time, becomes a light ray control array in which each set of nine pixels 21c, 21c, . . . functions as one light ray control element.

Similarly to the pixel data generation part 14 of the first embodiment, a pixel data generation part 14c of the data processing circuit 10c generates, as pixel data of nine pixels 21c, 21, . . . of each light source 22, pixel data that represent the same point on an object and include data of brightness corresponding to each outgoing direction for each pixel 21c. The panel driving circuit 15c receives the pixel data, and changes light transmittances of the nine pixels 21c, 21c, . . . corresponding to each light source 22, to make those nine pixels 21c, 21c, . . . output respective light rays that represent the same point on the object and have the brightness levels corresponding to their outgoing directions.

As a result, similarly to the first embodiment, in the present embodiment also, brightness of the same point on an object is seen differently when the viewer is at a different view position. Thus, also the present embodiment can show an object with high-quality texture.

Figure 12:
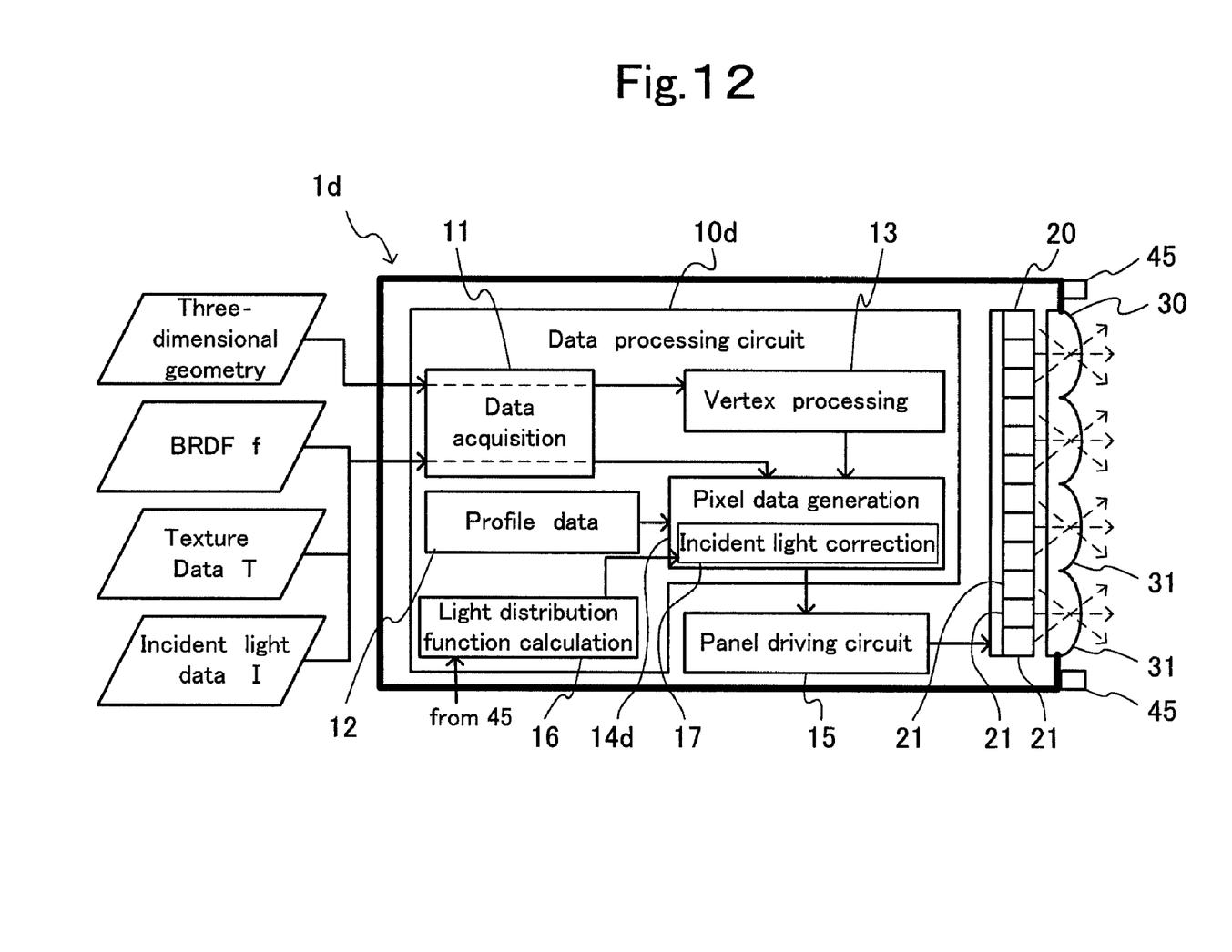
FIG. 12 is a diagram showing a configuration of a texture image display apparatus of a fifth embodiment according to the present invention.

Next, a texture image display apparatus of a fifth embodiment according to the present invention will be described referring to FIG. 12.

The texture image display apparatus 1d of the present embodiment is obtained by providing a plurality of optical sensors 45, 45, . . . to the texture image display apparatus 1 of the first embodiment. The optical sensors 45, 45, are provided one for each of the four corners of the front surface of the texture image display apparatus 1d, making a total of four optical sensors. The data processing circuit 10 is provided with a light distribution function calculation part 16 for obtaining a function of light distribution in the neighborhood of the display surface of the texture image display apparatus 1d on the basis of the light sensors 45. The pixel data generation part 14d is provided with an incident light data correction part 17 for correcting incident light data from the data acquisition part 11.

In the present embodiment, light quantity data for the neighborhood of the display surface, which are measured by the optical sensors 45, are inputted to the light distribution function calculation part 16, and the light distribution function 16 obtains a light distribution function for the neighborhood of the display surface. This light distribution function I(s, t) has coordinates (s, t) in the lens coordinate system, as a parameter. Although, there are various methods of obtaining a light distribution function including, for example, a method in which light measuring points are interpolated by a spline, any method can be employed. Receiving incident light data I(s, t, u', v') from the data acquisition part 11, the incident light data correction part 17 generates new incident light data I'(s, t, u', v') by substituting the same coordinate value as the lens coordinate value in the incident light data into the light distribution function I(s, t) and then by multiplying the light distribution function I(s, t) by the incident light data I(s, t, u', v'), as shown in the following equation.

$$I'(s, t, u', v') = I(s, t) * I(s, t, u', v')$$

Figure 5:
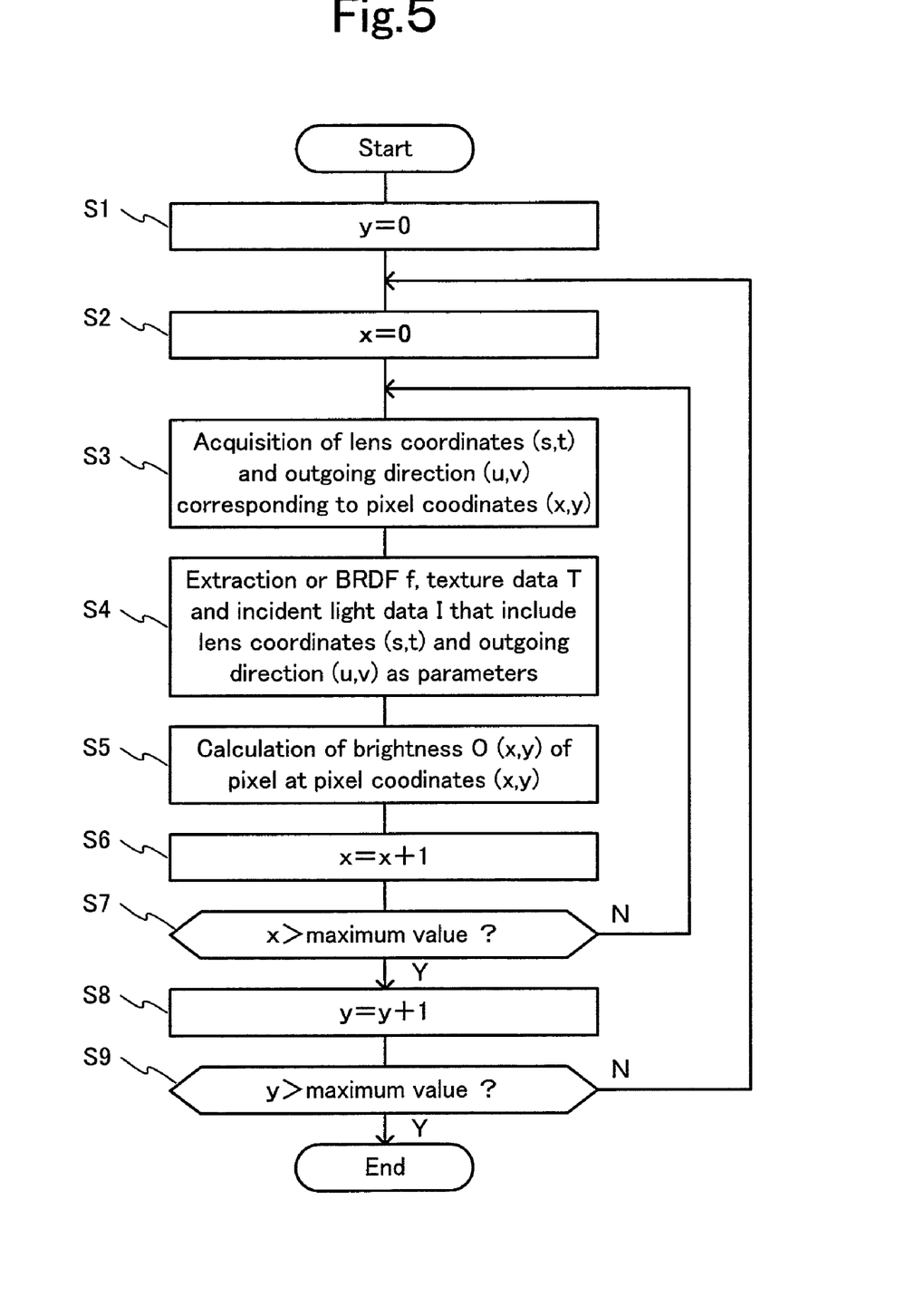
FIG. 5 is a flowchart showing a method of acquiring brightness of each pixel of the panel display device in the first embodiment of the present invention.

In the present embodiment, the new incident light data I'(s, t, u', v') is used to perform the processing in step 5 shown in FIG. 5, i.e., obtaining brightness O(x, y) of a pixel at the pixel coordinate (x, y).

According to the present embodiment, for example in the case where a decorative object is displayed and the left side of the display surface is bright, it is possible to display the decorative object such that its left side is displayed more brightly, to give a more realistic sensation.

In the present embodiment, a plurality of optical sensors 45, 45, . . . are provided. However, it is possible to provide only one optical sensor. In that case, when the neighborhood of the display surface is bright, the whole of a displayed object is displayed brightly. Although the present embodiment is an application of the first embodiment, clearly the present embodiment can also be applied to the above-described second through fourth embodiments also.

Figure 13:
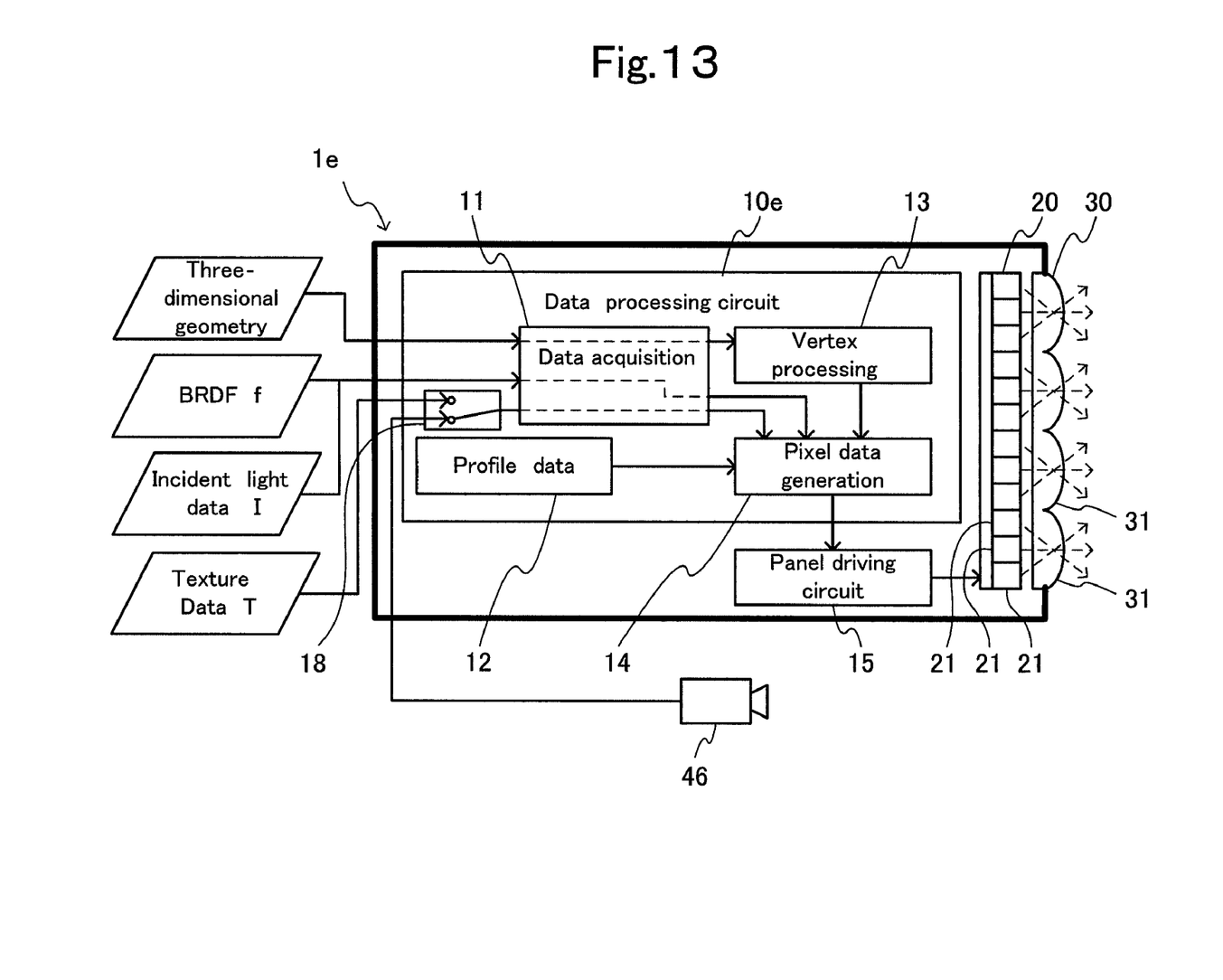
FIG. 13 is a diagram showing a configuration of a texture image display apparatus of a sixth embodiment according to the present invention.

Next, a texture image display apparatus of a sixth embodiment according to the present invention will be described referring to FIG. 13.

The texture image display apparatus 1e of the present embodiment is obtained by providing a camera 46 and a data switching unit 18 in the first embodiment. The data switching unit 18 selectively delivers either texture data obtained by the camera 46 or texture data obtained together with BRDF to the data acquisition part 11.

In the present embodiment, for example in the case where an image of fabric with a pattern is taken by the camera 46 while clothing with another pattern is being displayed, it is possible to change the pattern of the displayed clothing by replacing the texture data obtained in this image taking operation, with previously obtained texture data.

Although the present invention is an application to the first embodiment, clearly the present embodiment can be applied to the above-described second through fifth embodiments also.

The invention claimed is:

1. A texture image display apparatus provided with a display device that has a plurality of pixels, the apparatus comprising:
    a light ray control element array that has a plurality of light ray control elements for directing incident light toward a plurality of predetermined outgoing directions depending on a light incidence parameter, and that controls outgoing directions of light emitted by the display device;
    a pixel data generation unit, which generates pixel data for each pixel of the display device depending on an outgoing direction of light outputted from the pixel in question, such that a brightness of an image at a point in displayed content is changed depending on the plurality of predetermined outgoing directions;
    a driving unit, which generates a driving signal based on the pixel data generated by the pixel data generation unit for each pixel of the display device and delivers the generated driving signal to the display device to drive the display device; and
    a data acquisition unit, which acquires, for each point on an object to be displayed, a reflectance function that has as parameters a direction of incident light and a direction of outgoing light with respect to the object, and indicates reflectance which is a ratio of light quantity of the outgoing light to light quantity of the incident light, and acquires texture data of the object and incident light data indicating brightness of the incident light;
    wherein the pixel data generation unit generates the pixel data for each pixel that outputs light directed in a predetermined outgoing direction through the light ray control element to represent a certain point on the object, according to a reflectance indicated by a reflectance function, texture data and incident light data, and which satisfies a formula of: pixel data =reflectance ×texture data ×incident light data.

2. A texture image display apparatus Of claim 1, wherein:
    the display device is a panel display device; and
    each of the plurality of light ray control elements of the light ray control element array is an optical element that is associated with a plurality of pixels adjacent to one another among the plurality of pixels of the panel display device, and changes respective directions of light rays outputted from the associated plurality of pixels into the plurality of predetermined outgoing directions that are different from one another.

3. A texture image display apparatus of claim 1, wherein:
    each of the plurality of light ray control elements of the light ray control element array corresponds to one pixel among the plurality of pixels of the panel display device; and each of the plurality of light ray control elements has a optical element to that of, and a driving source which changes direction of a corresponding optical element such that a light ray from the corresponding optical element is directed in the predetermined outgoing direction.

4. A texture image display apparatus of claim 1, wherein:
    the display device has a plurality of light sources and a liquid crystal panel which transmits light emitted from the plurality of light sources to form an image; and
    the light ray control element array is the liquid crystal panel, wherein each light ray control element is constituted of a plurality of adjacent pixels of the liquid crystal panel, corresponds to one light source, and changes respective transmitted light quantities of the plurality of adjacent pixels of the liquid crystal panel.

5. A texture image display apparatus of claim 1, further comprising:
    an optical sensor which detects a light quantity; and
    an incident light data correction unit, which corrects brightness of the incident light indicated by the incident light data depending on the light quantity detected by the optical sensor.

6. A texture image display apparatus of claim 1, further comprising:
    a camera which acquires an image; and
    a switching unit that switches from the texture data acquired by the data acquisition unit, to texture data of an image taken by the camera.

* * * * *